March 10, 1970
H. J. SCHMICK
3,499,194
METHOD OF GLASS TEXTURIZING
Filed March 20, 1968
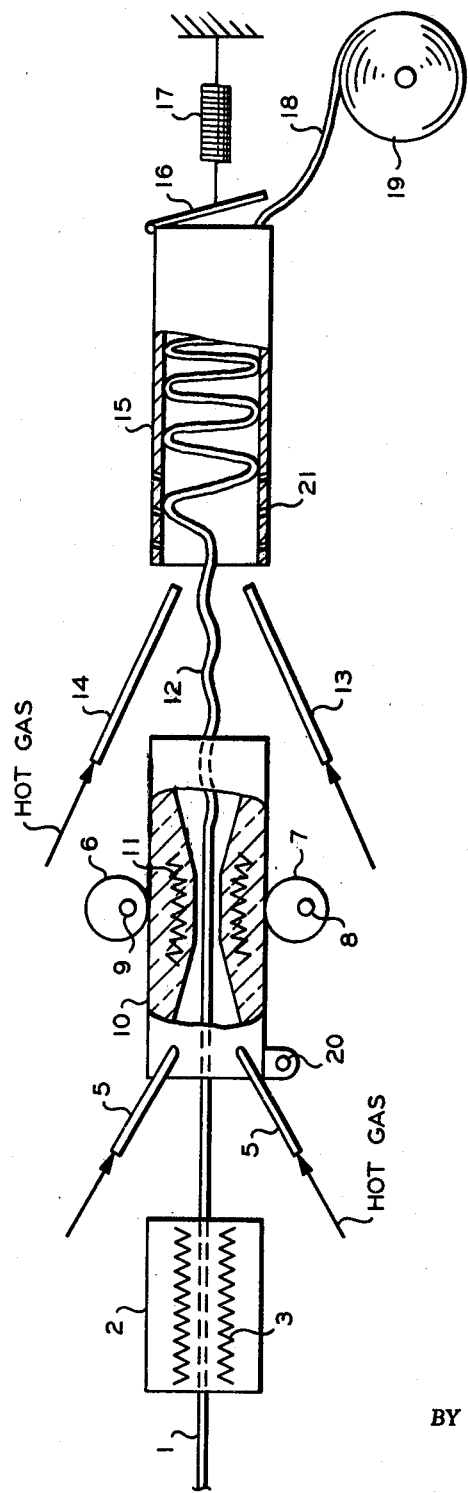
INVENTOR.
H. J. SCHMICK
BY *Young and Srigg*
ATTORNEYS

United States Patent Office 3,499,194
Patented Mar. 10, 1970

3,499,194
METHOD OF GLASS TEXTURIZING
Hayes J. Schmick, Greenville, S.C., assignor to Phillips Petroleum Company, a corporation of Delaware
Filed Mar. 20, 1968, Ser. No. 714,648
Int. Cl. D02g 1/12
U.S. Cl. 28—72.14         10 Claims

ABSTRACT OF THE DISCLOSURE

Glass fibers or strands comprising at least one glass filament are permanently waved, e.g., crimped, by passing them at a temperature within the working temperature range of the glass through an orifice oscillating laterally to the direction of strand travel, accumulating and compacting the waves thus formed at a temperature within the working temperature range and below the minimum cohesion temperature of said glass and cooling the compacted waved strand to a temperature below the working temperature thereof.

BACKGROUND OF THE INVENTION

Numerous methods have been devised for modifying the structure and appearance of natural and synthetic textile materials such as texturizing, crimping, bulking, waving, etc. These methods usually involve subjecting strands of the textile to severe conditions of discriminating stress and are, as a result, not readily adaptable to the treatment of glass strands and filaments.

It is generally known that most varieties of glass are Rheopectic Dilatant materials which exhibit non-Newtonian response to shear. As a result of this characteristic, there exist critical extremes of shear rate, e.g., deformation rate, for all of these forms of glass at temperatures above the softening point which cannot be exceeded without stress failure. Shear rate is, of course, a function of deformation rate. When applied to the texturizing of glass filaments, these considerations necessarily involve the amplitude of the deformations in a glass filament or bundle of filaments, the diameter or denier of these filaments taking into account shear of internal origin, the rate at which these deformations are effected and, of course, the temperature at which the glass is worked.

As a result, it can be seen that the tolerable working rate of any variety of glass can be increased by increasing the temperature of glass filament during deformation. However, in any given process, there is necessarily an upper limit on temperatures that can be employed for several reasons. It is often desirable that no substantial change of filament cross-section or undue thinning and weakening of filaments result during the texturizing process. It is also necessary in my process to compact the deformed filaments or bundles of filaments shortly after deformation to set the crimps produced in the running work piece. During this procedure several loops or crimps of the strand will necessarily contact each other with resulting adhesion and intermittent bonding if the work piece exists at that point at a temperature in excess of its minimum cohesion point. This consideration as well as the others aforementioned relating to the desirability of uniformity over the entire strand length require that a certain maximum temperature not be exceeded.

As a result of these considerations there exists a relatively narrow range of operating temperatures for any given glass composition within which the desired texture can be imparted to a strand, filament or yarn. When dealing with yarns the maximum temperature limitation becomes even more critical in that the minimum cohesion temperature should not be exceeded at any time to avoid cohesion and cross bonding of the several filaments which comprise the yarn. For these reasons and in view of the characteristics of most glass presently available it is reasonable to conclude that working speeds should not exceed 1,000 m./m. The essence of my idea is to provide a method and apparatus whereby a high degree of uniform texturizing of glass filaments can be achieved while assuring a high degree of continuity in the work piece, i.e., absence of stress failure. My method and apparatus provide that a great number of incremental lengths of a glass strand, e.g., filament, yarn, etc., are progressively bent so as to reduce overall working time without shortening the time required for any one deformation, e.g., rate of bending, etc.

It is therefore one object of this invention to provide a method for treating glass strands. It is another object of this invention to provide a method for texturizing strands of one or more glass filaments. It is yet another object of this invention to provide a method for producing permanently waved glass strands.

BRIEF SUMMARY OF INVENTION

In accordance with one embodiment of this invention a glass strand comprising one or more glass filaments is passed at a temperature within the working temperature range of the glass through an orifice oscillating laterally to the direction of strand travel to produce waves in the travelling strand, after which the waves are accumulated and compressed at a temperature within the working temperature range yet below the minimum cohesion temperature of said glass with the temperature of the glass then being reduced below the minimum working temperature to set the compacted waves.

In accordance with another embodiment of this invention a glass strand comprising at least one glass filament is preheated to a temperature within the working temperature range and waved by passage at said working temperature through a venturi orifice oscillating laterally to the direction of travel of said strand. The waves thus formed are accumulated and compacted at a working temperature below the minimum cohesion temperature of said glass and cooled in the compacted form to set said waves.

Referring now to the drawing, the figure is a schematic illustration of the preferred embodiment of this invention.

A glass strand comprising at least one filament 1 is passed to preheater 2 having therein electrical resistance heating elements 3 or other suitable heating means such as gas radiant heat for bringing the temperature of the strand to within the working temperature range of the glass.

All types of glass which can be worked, i.e., are valuable and flexible in the filament or strand sizes having relatively small thickness at temperatures below the cohesion temperature of the glass are suitable for application within the concept of this invention. Numerous varieties of glass that can be used in this process and some of their working characteristics and methods of manufacture are discussed by Kirk-Othmer in "Encyclopedia of Chemical Technology," 2nd edition, vol. 10, 1966. Several of the presently most popular glasses and their working temperatures are: lead silicate, 600° F.–850° F.; soda lime, 750° F.–1850° F.; and borosilicate, 1200° F.–2400° F.

The heated strand is then passed to oscillating venturi 10 internally heated by resistance heaters 11 to maintain the temperature of the strand within the working range. The venturi 10 is oscillated through an arc lateral to the general direction of strand travel about pin 20 by the action of cams 6 and 7 which rotate about pins 9 and 8, respectively. To reduce thermal shock it is preferred to use ceramic inserts inside the venturi.

A significant aspect of this particular operation is the provision of steam jets 5 which accomplish a two-fold purpose. They serve on the one hand to draw the strand 1 through oscillating venturi 10 while creating turbulence within the venturi sufficient to maintain the glass strand in a state of suspension while passing through the orifice. Secondly, in the preferred embodiment, the steam passing through jets 5 is at a temperature equal to or in excess of the desired working temperature of the glass strand depending on the amount of ambient air drawn into the inlet of venturi 10 whereby the desired temperature of the glass is maintained.

The oscillation of the venturi in this embodiment produces waves 12 which are forced into stuffing box 15 under the influence of jets such as 13 and 14. As these waves accumulate in stuffing box 15 they are compacted under the influence of a biased restriction such as trap door 16 which in this embodiment is illustrated as being spring biased to the closed position by compression spring 17. Steam outlet holes 21 are also provided in the first part of the stuffer box.

At this point the glass has been allowed to cool or is cooled to a temperature below the working temperature so that the compacted waves are set. The textured strand 18 is then removed from stuffing box and collected as desired, for example, on spool 19.

The operation of jets 13 and 14 and their cooperation with stuffing box 15 or other suitable compacting means of similar operation are also significant aspects of this invention.

The gas passed through compacting jets 13 and 14 can be essentially any fluid that is stable at the elevated temperatures involved. For example, steam nitrogen or air can be employed.

Fluid emanating from the compacting jets which are in this embodiment oriented at an acute angle with the general direction of strand travel performs the function of cooling the strands gradually so as to prevent cohesion of adjacent waves during compaction and reduce the temperature of the compacted strand gradually to a temperature below the minimum working temperature so that the waves are set as they are removed from the compacting zone, e.g., stuffing box 15 in this embodiment.

In addition, these jets perform the function of directing waves 12 produced by oscillating orifice 10 into stuffing box 15 and compact the waves toward the exit end of the stuffing box. As a result, it is preferred that the compacting jets impinge on the strand wave as the strand exits venturi 10. In addition, it is preferred that the spacing between the exit of venturi 10 and the inlet of stuffing box 15 be relatively short generally on the order of 2" or less so that waves 12 do not sag appreciably before their entrance into the compaction zone. It is also preferred that steam outlet holes 21 be provided in the front portion of the stuffing box 15 to give an escape route for the steam and thus prevent impeding of the forward motion of the strand 1 by a conflicting circulation. The size of these vents should be sufficient to allow the escape of steam through the receiver 15 sidewalls without the creation of substantial back pressure.

Due to the fact that one function of compacting jets 13 and 14 is to effect the gradual cooling of the strand to a point below the minimum working temperature thereof, the operating temperatures of the jet fluid will consequently be determined by the minimum working temperature of the particular glass process. However, for the materials above-mentioned, the jet temperature will usually be within the range of from about 212° F. to about 400° F.

Obviously, operating conditions employed in this process can vary considerably depending upon the glass characteristics, degree of waving, e.g., texture desired, the amplitude and wave length of the waves produced and the strand travel speed. However, it is presently preferred that at strand speeds within the range of from about 0.1 to about 55 feet per second that wave amplitude be within the range of from about 0.01 to about 0.1 inch at wavelengths within the range of from about 0.005 to about 2.0 inches. The frequency of oscillation of venturi 10 will obviously be related to the wave length and speed of strand travel and will usually be within the range of from about 100 to about 15,000 cycles per second at an amplitude approximating the desired amplitude of the resulting waves. The strand fed to the stuffer box can be either a single strand or a plurality of strands, e.g., yarn. The denier of these strands, in either single or multiple arrangement, is determined for reasons of practicability by the strain rate which the strand material can accommodate. In addition, the maximum yarn size practicable is limited, in some instances, by the necessity of uniform heating and temperature control. As a result of these considerations it is generally preferred to employ strands, in either single or multiple arrangement, having deniers within the range of from 0.5 to 15. The total denier of a yarn of such strands is preferably within the range of 10 to 6,000.

It should be observed that numerous equivalents for the apparatus illustrated in the drawings are obviously applicable within the scope of this invention. For example, it is preferred, although not necessary, that the strand waves be created by a venturi such as that described. For example, a simple orifice would suffice in numerous applications wherein the drawing force would be created by the compacting jets rather than by the described jets at the entrance of the venturi. In addition, the unheated glass strand can be passed directly to a heated oscillating orifice or venturi without the preferred preheating step described. It is also possible, and often preferred, to drive the oscillating device, e.g., venturi orifice, etc., by means of an ultrasonic frequency generator where any high frequencies or strand travel ratios are employed.

I claim:

1. A process for texturizing a glass strand of at least one filament which comprises producing a plurality of waves in said strand at a temperature within the working temperature range of said glass, said waves being mechanically produced in the moving strand by an oscillating device moving laterally to the direction of travel of the strand, compacting said waves at a temperature below the minimum cohesion temperature of said glass and cooling said glass to a temperature below the minimum working temperature of said glass to set said waves.

2. The process of claim 1 wherein said strand comprises a plurality of filaments having deniers within the range of from about 0.5 to about 15.

3. The process of claim 1 wherein said strand is passed through an orifice oscillating laterally to the direction of travel of said strand at said working temperature to produce said waves.

4. The process of claim 3 wherein said orifice comprises a ceramic lined venturi nozzle and said strand is heated at said working temperature within said nozzle.

5. The process of claim 4 wherein said strand is contacted by a plurality of fluid jets within said venturi at a temperature at least equivalent to said working temperature.

6. The process of claim 3 wherein said strand is heated to at least said working temperature before entering said orifice.

7. The process of claim 3 wherein said orifice oscillates at a frequency of from about 100 to about 15,000 cycles per second with an amplitude of from about 0.01 to about 0.1 inch at a spacing from the point at which said waves are compacted of from about 0.005 to about 2 inches and wherein the rate of travel of said strand is within the range of from about 0.1 to about 55 feet per second.

8. The process of claim 1 wherein said waves are compacted in a stuffing box.

9. The process of claim 8 wherein the compaction of said waves is facilitated at least in part by a plurality of fluid jets impinging on said strand and disposed at an acute angle with the direction of travel of said strand.

10. The process of claim 9 wherein said fluid jets are steam jets at a temperature below said minimum working temperature.

References Cited
UNITED STATES PATENTS

| | | | |
|---|---|---|---|
| 2,390,572 | 12/1945 | De Brabander | 28—1.6 |
| 3,000,060 | 9/1961 | Shattuck et al. | 28—1.6 |
| 3,396,443 | 8/1968 | Stanley | 28—1.6 |
| 2,500,690 | 3/1950 | Lannan. | |
| 2,671,745 | 3/1954 | Slayter. | |
| 3,012,923 | 12/1961 | Slayter. | |
| 3,343,240 | 9/1967 | Parmeggiani et al. | |
| 3,373,470 | 3/1968 | Joly | 28—72 |

LOUIS K. RIMRODT, Primary Examiner